United States Patent [19]

Défago et al.

[11] Patent Number: 4,560,387

[45] Date of Patent: Dec. 24, 1985

[54] AQUEOUS FORMULATIONS FOR DYEING AND PRINTING BLENDED FABRICS

[75] Inventors: Raymond Défago, Riehen; Sabahattin Güz, Basel, both of Switzerland

[73] Assignee: Ciba-Geigy Corporation, Ardsley, N.Y.

[21] Appl. No.: 699,288

[22] Filed: Feb. 7, 1985

[30] Foreign Application Priority Data

Feb. 13, 1984 [CH] Switzerland ............... 679/84

[51] Int. Cl.$^4$ ............................................. C09B 67/00
[52] U.S. Cl. ............................................. 8/527; 8/532; 8/543; 8/562; 8/638
[58] Field of Search .............. 8/527, 562, 638, 532

[56] References Cited

U.S. PATENT DOCUMENTS 3,844,806 10/1974 Wegmann et al. ............... 8/527
4,449,985 5/1984 Ditzer ............................. 8/528
4,523,924 6/1985 Lacroix ............................ 8/527

FOREIGN PATENT DOCUMENTS 0059782 9/1982 European Pat. Off. .
0114031 7/1984 European Pat. Off. .
2010928 7/1982 United Kingdom .

*Primary Examiner*—A. Lionel Clingman
*Attorney, Agent, or Firm*—Edward McC. Roberts; Kevin T. Mansfield

[57] ABSTRACT

The invention relates to novel aqueous formulations for dyeing and printing polyester/cellulose blends. In addition to containing at least one water-insoluble or sparingly water-soluble dye and at least one fibre-reactive dye, these formulations contain a non-ionic water-soluble cellulose ether, preferably hydroxyethyl cellulose. The formulations have a very good shelf life, do not recrystallize and do not form tacky deposits.

9 Claims, No Drawings

AQUEOUS FORMULATIONS FOR DYEING AND PRINTING BLENDED FABRICS

The present invention relates to aqueous dye formulations, to the preparation thereof, and to the use of said formulations for dyeing and printing polyester/cellulose blends.

Aqueous formulations of water-insoluble or sparingly water-soluble dyes which can be used for dyeing and printing synthetic textile materials, in particular polyester materials, are known from DE-PS No. 28 50 482. Further, aqueous formulations of reactive dyes which can be used for dyeing and printing natural and synthetic fibre materials, in particular cellulose, are known from European patent applications Nos. 0059782 and 0114031.

Mixing these two formulations in order to use them for dyeing and printing polyester/cellulose blends results after a short time in the formation of tacky deposits which render the technical use of such aqueous formulations impossible. In some cases also a recrystallisation of the water-soluble dye components also results.

It is the object of the present invention to eliminate these drawbacks.

It has now been found that it is possible to prepare storage-stable mixtures of disperse dye formulations and formulations of reactive dyes by adding a nonionic water-soluble cellulose ether to such mixtures to effect stabilisation. Accordingly, the present invention relates to aqueous formulations comprising at least one water-insoluble or sparingly water-soluble dye and at least one fibre-reactive dye and optionally further auxiliaries, which formulations contain a non-ionic water-soluble cellulose ether.

A suitable non-ionic water-soluble cellulose ether is in particular hydroxyethyl cellulose, preferably hydroxyethyl cellulose having a molecular weight of over 40,000, most preferably over 150,000. A good stabilising effect is obtained in particular with those hydroxyethyl celluloses having an average molecular weight in the range from $4 \times 10^4$ to $2 \times 10^6$, preferably from $1.5 \times 10^5$ to $1 \times 10^6$. In addition to hydroxyethyl cellulose, a suitable water-soluble cellulose ether is in particular methyl cellulose, preferably methyl cellulose having a molecular weight of $1 \times 10^4$ to $5 \times 10^5$. Such cellulose ethers, which are in the form of individual compounds or mixtures, are used in an amount of about 1 g to 10 g, preferably of 3 g to 7 g, per kg of formulation.

Particularly suitable water-insoluble or sparingly water-soluble dyes are in particular disperse dyes. Such dyes belong to different classes and are for example nitro dyes, aminoketone, dyes, ketoneimine dyes, methine dyes, nitrodiphenylamine dyes, quinoline dyes, aminonaphthoquinone dyes, coumarin dyes and, in particular, anthraquinone dyes and azo dyes such as monoazo and disazo dyes.

It is also possible to use mixtures of different disperse dyes.

However, it is advantageous not to use the dye (reduced or unreduced) as such, but in the form of an aqueous formulation which contains the water-insoluble or sparingly water-soluble dye (or mixture). Suitable aqueous formulations of this kind are in particular those described in DE-PS No. 28 50 482.

Suitable fibre-reactive dyes are those which contain one or more radicals which are reactive under the dyeing conditions and which are able to react with the hydroxyl groups of cellulose to form chemical bonds when the dyes are applied to cellulose materials in the presence of acid acceptors and optionally with the application of heat.

A host of such fibre-reactive groupings are known from the literature, for example reactive groups of the vinylsulfone series and their sulfamide derivatives; and in particular heterocyclic radicals such as such as those containing 2 or 3 nitrogen atoms in the heterocycle, for example those of the halotriazinyl, haloquinoxalinyl, halopyridazinyl and halopyrimidinyl series; or the acyl radicals of halogen-containing aliphatic carboxylic acids or unsaturated carboxylic acids, for example the acyl radical of acrylic acid; or the radicals of β-bromopropionic acid and α,β-dibromopropionic acid.

In addition to the vinylsulfonyl group itself, examples of fibre-reactive groups of the vinylsulfone series are aliphatic sulfone groups which contain, β-oriented to the sulfone group, a group which is removable under alkaline conditions such as a halogen atom or an ester radical of an acid, for example the β-chloroethylsulfonyl group, for example the β-chloroethylsulfonyl group, the β-acetoxyethylsulfonyl group, the β-(3-sulfobenzoyloxy)ethylsulfonyl group, the β-sulfatoethylsulfonyl group, the β-thiosulfatoethylsulfonyl group, the β-phosphatoethylsulfonyl group and the β-sulfatoethylsulfonylmethylamino group, or the vinylsulfonylmethylamino group.

Preferred reactive groups are in particular an acyl group of a carboxylic acid or, preferably, heterocyclic groups, which groups contain at least one halogen atom which is removable under dyeing conditions.

The reactive groups are for example the following: s-triazinyl radicals which carry one or two halogen atoms, for example chlorine, fluorine or bromine atoms, at the triazine ring, pyrimidyl radicals which carry one to three halogen atoms, for example chlorine and/or fluorine atoms, or one or two arylsulfonyl or alkanesulfonyl groups, at the pyrimidine ring, or 2,3-dichloroquinoxaline-5-or -6-carbonyl groups or 2-chlorobenzthiazolyl groups.

In particular, the reactive groups are monochlorotriazinyl or monofluorotriazinyl groups, dichlorotriazinyl or difluorotriazinyl groups, dichloropyrimidinyl or trichloropyrimidinyl groups and difluorochloropyrimidinyl groups.

The reactive dye is preferably a fibre-reactive dye which contains, as reactive radical, at least one heterocyclic group that contains at least one removable halogen atom, preferably a dye of formula 1

$$D—Z_n \qquad (1)$$

wherein D is the radical of a metal-free or metalliferous azo, anthraquinone or phthalocyanine dye that carries one or more water-solubilising groups, Z is a diazinyl or triazinyl group that contains at least one removable halogen atom and which may be linked to D through an amino group, and n is 1 or 2.

Further preferred dyes are those of formula 1a $$D—Z'_n \qquad (1a)$$

wherein D is as defined for formula 1 and Z' is a group of the formula

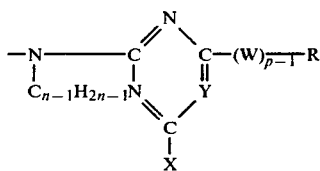

wherein
W is

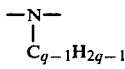

X is halogen, preferably Cl or F,
Y is =N—, =CH— or =CX—,
n is 1 or 2, preferably 1,
p is 1 or 2, and
q is 1 to 3,
with the proviso that, if p is 2, R is unsubstituted or substituted lower alkyl, phenyl or naphthyl, and, if p is 1, R may be halogen, lower alkoxy, hydroxyalkoxy or alkoxyalkoxy, lower alkylsulfonyl, unsubstituted or substituted phenoxy or —NH$_2$.

A further class of preferred reactive dyes comprises those of the formula 2

$$D'-Z''_n \qquad (2),$$

wherein D' is the radical of a metal-free or metalliferous azo, nitro, pyrazolone, thioxanthone, oxazine, anthraquinone, stilbene or phthalocyanine dye that contains one or more water-solubilising groups, and Z" is an acyl radical of a halogen-containing aliphatic carboxylic acid or of an unsaturated carboxylic acid, and n is 1 or or 2.

The reactive dyes which contain sulfo groups and, where appropriate, the metal complexes thereof, are preferably used in the form of the metal salts as obtained in the synthesis, for example of the potassium, magnesium or, preferably, sodium salts. However, they can also be used in the form of their amine salts.

If desired, the reactive dyes can also be used in mixtures with each other or with dyes of another type.

It is also very advantageous to use aqueous dye formulations instead of the dyes, for example the formulations described in European patent application Nos. 0059782 or 0114031.

The aqueous formulations of this information may contain, as further auxiliaries, for example: foam inhibitors of low silicone content and preservatives based e.g. on phenol or cresol.

The aqueous formulations of this invention are stable in the temperature range from 12° to 35° C., have a shelf life of more than 12 months without deterioration, do not recrystallise and, in particular, do not form tacky deposits; and they have a viscosity in the range from 300 to 1000 mPa.s. These features have the great advantage for the printer that he need use only one single formulation for colouring polyester/cellulose blends and is not obliged to use two or more formulations of different dyes, depending on the substrate.

The preparation of these aqueous formulations can be effected by different methods, for example:

(a) by stirring an aqueous formulation containing at least one water-insoluble or sparingly water-soluble dye with a solid or predissolved non-ionic water-soluble cellulose ether to give a solution, and then adding an aqueous formulation containing at least one fibre-reactive dye, or (b) by stirring an aqueous formulation containing at least one fibre-reactive dye with a solid or predissolved non-ionic water-soluble cellulose ether to give a solution, and then adding an aqueous formulation containing at least one water-insoluble or sparingly water-soluble dye, or (c) by mixing an aqueous formulation containing at least one water-insoluble or sparingly water-soluble dye and at least one fibre-reactive dye with a solid or predissolved non-ionic water-soluble cellulose ether.

The aqueous formulations of this invention are used for dyeing and printing polyester/cellulose blends (irrespective of the mixture ratio, for example 67:33 or 50:50).

Suitable polyester materials are man-made or regenerated high molecular materials made from linear aromatic polyesters (usually polycondensates of terephthalic acid and glycols, in particular ethylene glycol, or polycondensates of terephthalic acid and 1,4-bis(hydroxymethyl)hexahydrobenzene), and from cellulose 2½ acetate and cellulose triacetate.

Suitable cellulose materials are those of natural and regenerated cellulose, for example hemp, linen, jute, viscose staple fibres and, in particular, cotton.

The polyester/cellulose blend can be for example in the form of woven fabric, knitted fabric, or of nonwoven fabric.

The textile material (blend) is printed or padded in known manner with the printing paste or padding liquor and subsequently dried. The dyes are then fixed on the blended fabric, for example by heating for 30 to 120 seconds to 190° to 225° C., preferably for 60 seconds to 210° to 215° C., or by steaming, for example under normal pressure with superheated steam at 170°–200° C. for 3 to 12 minutes, preferably for 5 to 8 minutes, or with steam for 15 to 30 minutes under a pressure of 1.5 bar.

The dyeing is then finished in the conventional manner after fixation. This process affords level prints or dyeings in good dye yield and in very level tone-in-tone shades.

The invention is illustrated by the following Examples in which parts and percentages are by weight.

PREPARATION OF THE AQUEOUS FORMULATIONS

An aqueous solution of hydroxyethyl cellulose (average mole. wt.: $5.6 \times 10^5$) is stirred at room temperature into an aqueous formulation (a) containing at least one water-insoluble to sparingly water-soluble dye. (The hydroxyethyl cellulose solution is obtained by stirring the powdered hydroxyethyl cellulose in water for 45 to 60 minutes at room temperature; the viscosity of the solution is about 48,000 mPa.s [Brookfield, 20 rpm, spindle 6]). A foam inhibitor (of low silicone content, based on 2-ethyl-n-hexanol) is then added. With constant stirring, an aqueous formulation (b) containing at least one reactive dye is then slowly added and stirring is continued. Even after prolonged standing, no tacky deposits precipitate from the low viscosity ready for use formulation so obtained.

The formulations (a) and (b) employed and the amounts thereof are indicated in the following table.

TABLE

| Example | Formulation a | Amount of formulation a | Formulation b | Amount of formulation b | Amount of hydroxyethyl-cellulose |
|---|---|---|---|---|---|
| 1 | formulation a1 | 13.8 parts | formulation b1 | 63.1 parts | 23.1 parts of a 3% aqueous solution |
| 2 | formulation a2 | 17.7 parts | formulation b2 | 59.2 parts | 23.1 parts of a 3% aqueous solution |
| 3 | formulation a3 | 22.7 parts | formulation b3 | 60.6 parts | 16.7 parts of a 3% aqueous solution |
| 4 | formulation a4 | 27.1 parts | formulation b4 | 56.2 parts | 16 parts of a 3% aqueous solution |
| 5 | formulation a5 | 26.4 parts | formulation b5 | 73.3 parts | 0.3 part as powder |
| 6* | formulation a6 | 22.2 parts | formulation b6 | 51.9 parts | 14.8 parts of a 3% aqueous solution |

*The formulation of Example 6 additionally contains 11.1 parts of water

Formulations (a1) to (a6) and (b1) to (b6) have the following composition:

Formulation (a1)

440 parts of the disperse dye of formula (101)

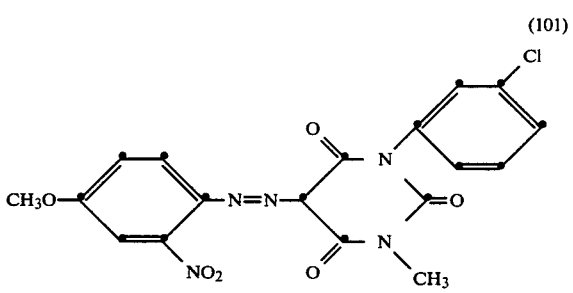

(101)

(as dry filter cake of low electrolyte content),
20 parts of sulfonated Kraft lignin (mol. wt.: 6000 to 50,000),
20 parts of a non-ionic ethylene oxide/propylene oxide block polymer (mol. wt.: ~16,500),
170 parts of 1,2-propylene glycol,
348 parts of water and
2 parts of preservative.

Formulation a2

42 parts of the disperse dye of the formula (102)

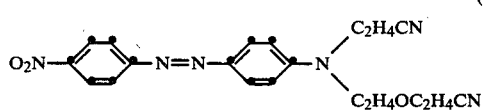

(102)

(crude dye of low electrolyte content)
2 parts of sulfonated Kraft lignin (mol. wt. 2000 to 30,000),
2 parts of a non-ionic ethylene oxide/propylene oxide block polymer (mol. wt.: ~16,500),
17 parts of 1,2-propylene glycol,
36 parts of water and
2 parts of preservative.

Formulation (a3)

c.30 parts of the disperse dye of the formula (103)

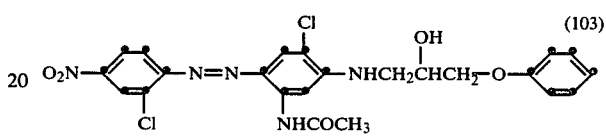

(103)

2 parts of lignosulfonate,
4 parts of an ethylene oxide/propylene oxide block polymer (80% of ethylene oxide and 20% of propylene oxide),
18 parts of 1,2-propylene glycol and
45 parts of water.

Formulation (a4)

consists of a mixture of two dye formulations, viz.
19 parts of a formulation comprising:
26.3 parts of the blue dye of the formula (104a)

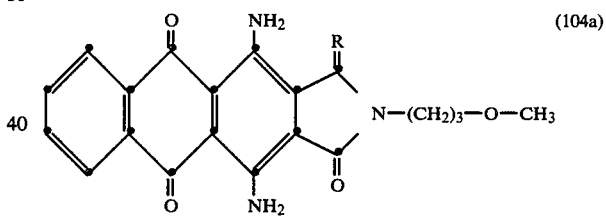

(104a)

R=NH with amounts of 0
22.4% of 1,2-propylene glycol,
3.0% of an ethylene oxide/propylene oxide block polymer (mol. wt.: 16,500),
2.0% of lignosulfonate (mol. wt.: 6000-50,000),
0.9% of preservative,
0.5% of foam inhibitor,
44.9% of water; and
8.1 parts of a formulation comprising:
41.5% of the violet dye of the formula (104b)

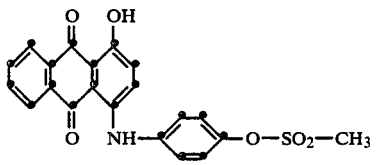

(104b)

17.8% of 1,2-propylene glycol,
3% of an ethylene oxide/propylene oxide block polymer (mol. wt. ~16,500),
1.6% of lignosulfonate (mol. wt. 6000-50,000),
0.8% of preservative, 0.1% of thickener,
0.3% of foam inhibitor, and
35% of water.

Formulation (a5)

consists of a mixture of two dye formulations, viz.
21.9 parts of a formulation comprising:
30.0% of the red dye of the formula (105a)

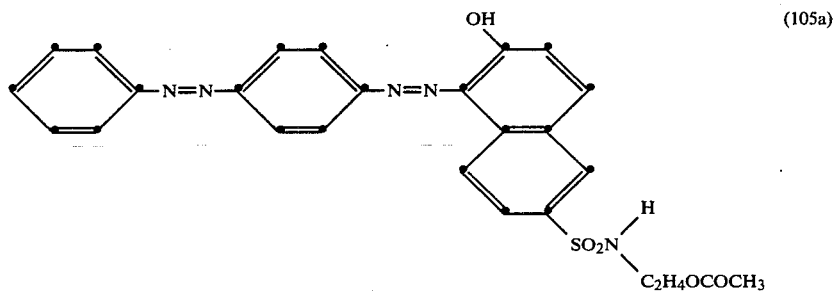
(105a)

21% of 1,2-propylene glycol,
3% of ethylene oxide/propylene oxide block polymer (mol. wt.: ~16,500),
1.5% of lignosulfonate (mol. wt. 6000–50,000),
0.7% of preservative,
0.2% of foam inhibitor,
43.6% of water; and
4.5 parts of a formulation comprising:
41.5% the violet dye of the formula (105b)

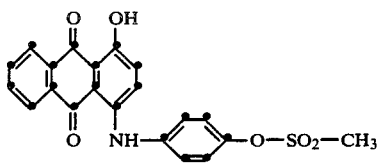
(105b)

17.8% of 1,2-propylene glycol,
3% of ethylene oxide/propylene oxide block polymer (mol. wt.: ~16,500),
1.6% of lignosulfonate (mol. wt. 6000–50,000),
0.8% of preservative,
0.1% of thickener,
0.3% of foam inhibitor
35% of water.

Formulation (a6)

38 parts of the disperse dye of the formula (106)

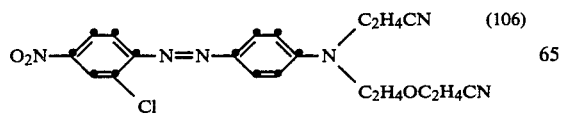
(106)

2 parts of oxylignosulfonate,
3 parts of ethylene oxide/propylene oxide block polymer (80% of ethylene oxide, 20% of propylene oxide),
18 parts of propylene glycol,
0.05 part of foam inhibitor,
1 part of preservative,
37 parts of water.

Formulation (b1)

22.1 parts of the reactive dye of the formula (107)

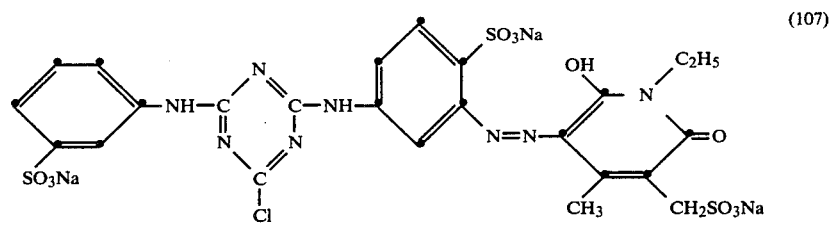
(107)

0.2 part of disodium hydrogen phosphate, and
c. 78 parts of water.

Formulation (b2)

c. 23 parts of the reactive dye of the formula (108)

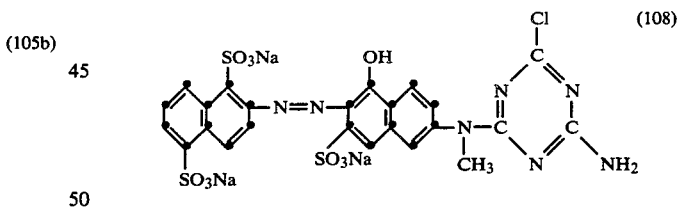
(108)

1.5 parts of sodium tripolyphosphate, and
75.5 parts of water.

Formulation (b3)

c. 25 parts of the reactive dye of the formula (109)

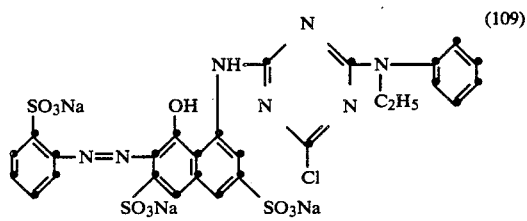
(109)

1.5 parts of sodium tripolyphosphate,
0.15 part of sodium dihydrogen phosphate, 73 parts of water.

Formulation (b4)

27.8 parts of the reactive dye of the formula (110)

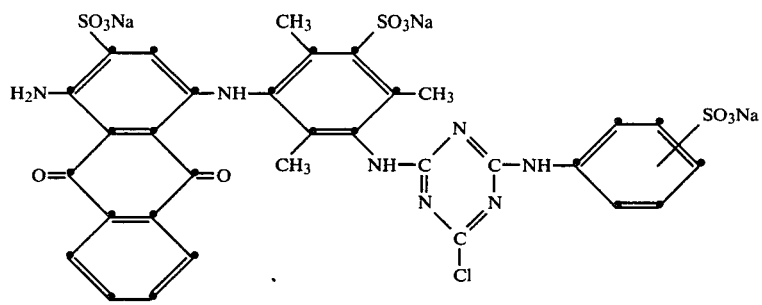
(110)

1.6 parts of disodium hydrogen phosphate,
0.8 parts of potassium hydrogen phosphate,
69.1 parts of water.

Formulation (b5)

26.3 parts of the reactive dye of the formula (111)

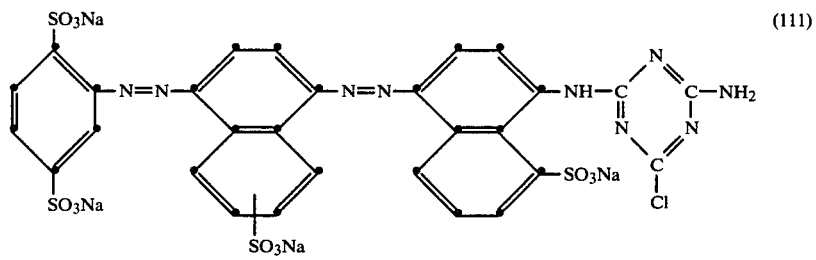
(111)

1.6 parts of disodium hydrogen phosphate.
0.8 part of potassium dihydrogen phosphate
71.3 parts of water.

Formulation (b6)

19–20 parts of the reactive dye of the formula (112)

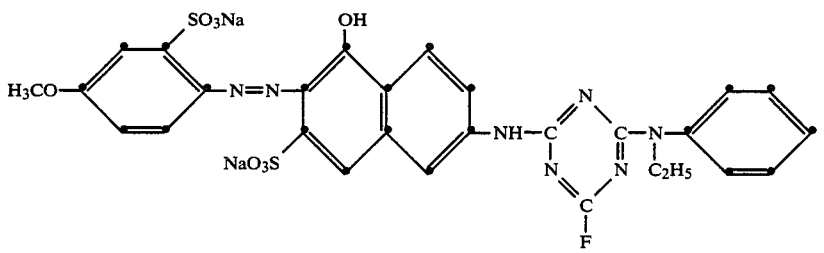
(112)

2 parts of sodium tripolyphosphate
78 parts of water.

Equally good formulations are obtained by mixing the appropriate formulations (a) and (b) and slowly stirring the powdered hydroxyethyl cellulose into this mixture.

EXAMPLE 7

With stirring, 20 parts of an aqueous 5% solution of methyl cellulose (average molecular weight of the methyl cellulose: c. 200.000) are added to 17.6 parts of an aqueous disperse dye formulation of the following composition:

30% of the dye of the formula (113)

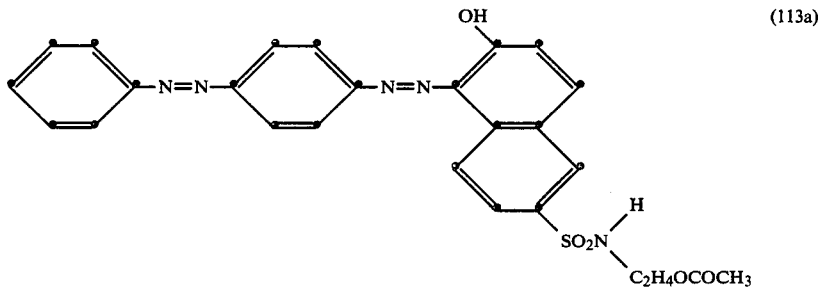
(113a)

1.5% of oxylignosulfonate,

3% of ethylene oxide/propylene oxide block polymer (mol. wt.: ~16,500),
0.7% of preservative,
21% of 1,2-propylene glycol,
0.2% of foam inhibitor,
43.6% of water; and
3.6 parts of a disperse dye formulation comprising:
41.5% of the violet dye of the formula (113b)

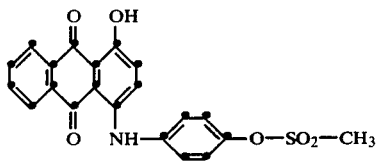
(113b)

17.8% of 1,2-propylene glycol,
3% of ethylene oxide/propylene oxide block polymer (mol. wt.: ~16,000),
1.6% of lignosulfonate (mol. wt. 6000-50,000),
0.8% of preservative,
0.1% of thickener,
0.3% of foam inhibitor,
35% of water.

Then 58.8 parts of an aqueous reactive dye formulation of the following composition are stirred in:
26.3% of the dye of the formula (114)

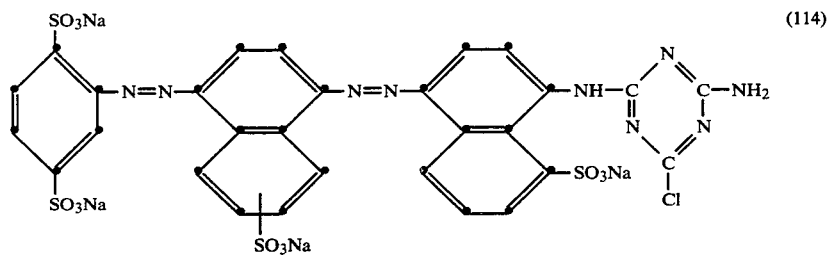
(114)

1.6% of disodium hydrogen phosphate,
0.8% of potassium dihydrogen phosphate,
71.3% of water.

A homogeneous dye formulation of low viscosity is obtained (viscosity: 750 mPa.s—Brookfield viscosimeter RVT, spindle 2; 20 rpm). The dye formulation has a pH in the range of 7.8 and is storage stable without deterioration. However, without the addition of methyl cellulose a tacky deposit forms even after brief storage.

EXAMPLE 8

(Printing method)

A polyester/viscose fabric (67:33) is printed as follows:
930 parts of a stock paste containing, per 1000 parts:
660 parts of water
5 parts of an emulsifier for oil-in-water emulsions, based on a fatty acid ethoxylate,
200 parts of white spirit (mixture of alkanes with a boiling of 150°–190° C.),
20 parts of sodium alginate,
100 parts of urea, and
15 parts of sodium bicarbonate are mixed with 70 parts of a dye formulation according to Example 1 and the blend is printed with this printing paste on a rotary screen printing machine. The printed fabric is then dried at 90° C. and the print is fixed with hot air for 75 seconds at 205° C. The fabric is then given a washing off. A brilliant yellow print with good contour definition, good fastness properties and a good tone-in-tone shade is obtained.

What is claimed is:

1. An aqueous formulation comprising at least one water-insoluble or sparingly water-soluble dye and at least one fibre-reactive dye, and optionally further auxiliaries, which formulation contains a non-ionic water-soluble cellulose ether.
2. An aqueous formulation according to claim 1, wherein the cellulose ether is hydroxyethyl cellulose.
3. An aqueous formulation according to claim 1, wherein the cellulose ether is methyl cellulose.
4. An aqueous formulation according to claim 2, wherein the hydroxyethyl cellulose has a molecular weight of more than 40,000.
5. An aqueous formulation according to claim 2, wherein the hydroxyethyl cellulose has a molecular weight of more than 150,000.
6. An aqueous formulation according to claim 1, which contains the non-ionic water-soluble cellulose ether in an amount of 1 g to 10 g per kg of formulation.
7. An aqueous formulation according to claim 1, which contains the non-ionic water-soluble cellulose ether in an amount of 3 g to 7 g per kg of formulation.
8. A process for the preparation of an aqueous formulation according to claim 1, which comprises
   (a) stirring an aqueous formulation containing at least one water-insoluble or sparingly water-soluble dye with a solid or predissolved non-ionic water-soluble cellulose ether to give a solution, and then adding an aqueous formulation containing at least one fibre-reactive dye, or
   (b) stirring an aqueous formulation containing at least one fibre-reactive dye with a solid or predissolved non-ionic water-soluble cellulose ether to give a solution and then adding an aqueous formulation containing at least one water-insoluble or sparingly water-soluble dye, or
   (c) mixing an aqueous formulation containing at least one water-insoluble or sparingly water-soluble dye and at least one fibre-reactive dye with a solid or predissolved non-ionic water-soluble cellulose ether.
9. A process for dyeing or printing polyester/cellulose blends, which comprises the use of an aqueous formulation as claimed in claim 1.

* * * * *